United States Patent [19]

Takano et al.

[11] Patent Number: 4,943,879
[45] Date of Patent: Jul. 24, 1990

[54] THIN FILM MAGNETIC HEAD INCLUDING MAGNETIC LAYERS HAVING HIGH SATURATION MAGNETIC FLUX DENSITY AND METAL FILM FOR AVOIDING DETERIORATION DURING MANUFACTURING

[75] Inventors: Hisashi Takano, Kokubunji; Yoshihiro Hamakawa, Koganei; Kazuo Shiiki, Kanagawa; Shigekazu Otomo, Sayama; Noriyuki Kumasaka, Ome, all of Japan

[73] Assignee: Hitachi, Ltd., Tokyo, Japan

[21] Appl. No.: 85,719

[22] Filed: Aug. 17, 1987

[30] Foreign Application Priority Data

Aug. 22, 1986 [JP] Japan ............... 61-195383
Jan. 14, 1987 [JP] Japan ............... 62-4820

[51] Int. Cl.$^5$ .............................. G11B 5/147
[52] U.S. Cl. ............................. 360/126; 360/120
[58] Field of Search ........... 360/125, 126, 127, 119, 360/122, 123, 110, 120

[56] References Cited

U.S. PATENT DOCUMENTS

| 4,048,714 | 9/1977 | Huntt ................. 360/120 X |
| 4,550,353 | 10/1985 | Hirai et al. ........... 360/125 |
| 4,558,385 | 12/1985 | Kaminaka ............. 360/126 |
| 4,636,897 | 1/1987 | Nakamura et al. ........ 360/125 X |

FOREIGN PATENT DOCUMENTS

| 0127911 | 8/1982 | Japan ................. 29/603 |
| 0171709 | 10/1983 | Japan ................. 360/126 |
| 0035315 | 2/1985 | Japan ................. 360/125 |

OTHER PUBLICATIONS

Marvyamo et al., Thin Film Head Using CoZr Amorphous Films 1983 p. 117.
Shiiki et al., Probe Type Thin Film Head For Perpendicular Magnetic Recording IEEE, vol. Mag 20, No. 5, Sep. 1984.

Primary Examiner—Robert S. Tupper
Assistant Examiner—Andrew L. Sniezek
Attorney, Agent, or Firm—Antonelli, Terry, Stout & Kraus

[57] ABSTRACT

A thin film magnetic head having a first magnetic layer of a saturation magnetic flux density greater than that of a Ni-Fe alloy and a second magnetic layer of a saturation magnetic flux density grater than that of a Ni-Fe alloy supported by a base layer, the magnetic layers for forming a magnetic core of the head with a non-magnetic material gap layer interposed therebetween, and an electrically insulating layer provided between the magnetic layers so that turns of coil wound about the magnetic core are partly formed in electrically insulated relation within the insulating layer, in which a metal film is provided between the first magnetic layer and the electrically insulating layer so that the electrically insulating layer does not contact with the first magnetic layer and/or another metal film is formed on the second magnetic layer so that the other metal layer is sandwiched between the non-magnetic layer and the second magnetic layer.

17 Claims, 2 Drawing Sheets

THIN FILM MAGNETIC HEAD INCLUDING MAGNETIC LAYERS HAVING HIGH SATURATION MAGNETIC FLUX DENSITY AND METAL FILM FOR AVOIDING DETERIORATION DURING MANUFACTURING

BACKGROUND OF THE INVENTION

The present invention relates to a thin film magnetic head suited for magnetic recording at a high density.

For the magnetic materials for constituting magnetic poles for a thin film magnetic head, Ni-Fe alloys capable of exhibiting a magnetic saturation flux density of 1 T at highest have heretofore been used. At present, however, there exists an intensive demand for increasing the magnetic saturation flux density of the thin film magnetic head material with a view to enhancing the recording density.

By way of example, a thin film magnetic head in which a non-crystalline Co-containing alloy film having a saturation flux density of about 1.4 T is employed for realizing the magnetic pole of the thin film magnetic head is disclosed in "Digests of the Seventh Annual Conference on Magnetics in Japan", 8PA5 (1983), p.117. Further, use of Fe-Si-Ru alloy having a saturation flux density of about 1.7 T for the magnetic material of a thin film magnetic head for a vertical magnetic recording is described in "IEEE Trans. On Mag.", Vol. MAG-20, No. 5 (Sept., 1984), pp. 839-841.

However, no consideration has been paid to problems encountered in the industrial-scale manufacturing process of thin film magnetic heads in which an organic material such as photoresist, PIQ (commercially available from Hitachi Kasei of Japan) or the like is used for realizing an insulating layer for electrically and magnetically insulating or isolating an upper magnetic layer and a lower magnetic layer from each other while non-organic materials such as $SiO_2$, $Al_2O_3$ or the like being used for forming the gap layer, and in which the magnetic poles are realized by using amorphous or non-crystalline alloys containing Co or crystalline alloys containing Fe.

More specifically, the inventors have found that during heat treatment at a high temperature in the manufacturing process of the thin film magnetic head, an unwanted and unnecessary reaction takes place between the non-crystalline, Co containing alloy or the crystalline, Fe containing alloy constituting the upper magnetic layer and the insulating layer, to bring about deterioration in the magnetic characteristics of the magnetic pole (such as, for example, increasing the coercive force by four to five times), while a non-magnetic gap layer formed on the non-crystalline, Co-containing alloy or crystalline, Fe-containing alloy which constitutes the lower magnetic layer is separated (exfoliated) or the tendency for separation (exfoliation) is promoted in the course of high temperature heat treatment, thereby providing an obstacle in realizing the magnetic head of high quality. It has also been found by the inventors that the non-magnetic gap layer may be separated (exfoliated) from the non-crystalline, Co-containing alloy or crystalline, Fe-containing alloy constituting the upper magnetic layer, during the above-mentioned high temperature heat treatment. Parenthetically, the high-temperature heat treatment mentioned above is carried out at about 400° C. for the purpose of curing the insulating layer as well as at an annealing temperature in the range of about 350° C. to about 400° C. for improving the magnetic characteristics of the magnetic layers.

SUMMARY OF THE INVENTION

An object of the present invention is to provide a thin film magnetic head which can be manufactured at a high yield and which can ensure enhanced recording/reproduction efficiency.

According to an aspect of the present invention, there is provided a thin film magnetic head which includes first and second magnetic layers for constituting a magnetic core, each of which layer is made of a magnetic material having a saturation magnetic flux density greater than that of a Ni-Fe alloy, the second magnetic layer being supported by a base layer, a metal film formed on an insulating layer which serves to electrically and magnetically insulate the first and second magnetic layers from each other, and/or other metal film formed on the second magnetic layer, wherein the one of other metal film serving to prevent the first magnetic layer from contacting directly with the insulating layer (e.g. polyimide resin layer) or prevent the second magnetic layer from contacting directly with a non-magnetic layer constituting a gap layer (e.g. of $SiO_2$, $Al_2O_3$, etc.). With the structure of the thin film magnetic head mentioned above, the first and/or second metal layer is effective to suppress the reaction which would otherwise occur between the insulating layer and the first magnetic layer and prevent delamination of the gap layer formed on the second magnetic layer by sputtering. Thus, the thin film magnetic head having magnetic poles realized by the material exhibiting high saturation magnetic flux density can be manufactured at high yield. The first magnetic layer may be made of a non-crystalline Co containing alloy, while the second magnetic layer may be made of crystalline Fe-containing alloy.

DESCRIPTION OF THE PREFERRED EMBODIMENTS

Figure 1:
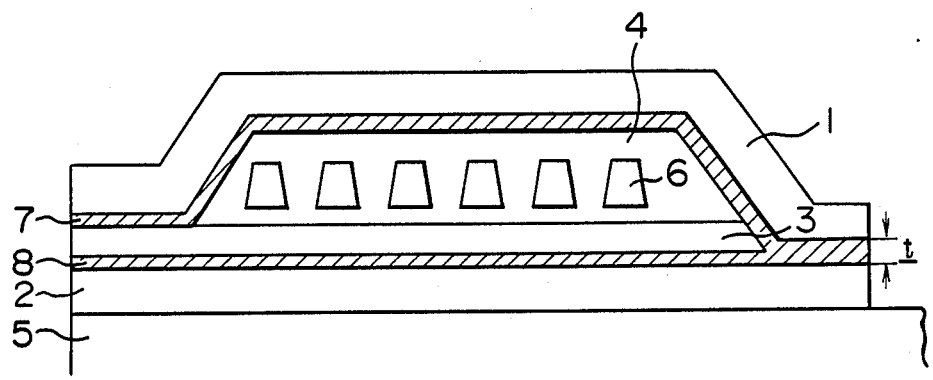
FIG. 1 is a view showing in a sectional view a main portion of a thin film magnetic head according to an exemplary embodiment of the present invention.

Now, the invention will be described in detail in conjunction with an exemplary embodiment thereof by referring to FIG. 1 which shows schematically a thin film magnetic head in a sectional view. It should be mentioned that those known structural details which constitute no essential parts of the invention such as, for example, a protection layer, two-layer realization of the magnetic core except for the portion thereof brought into contact with a recording medium for decreasing the reluctance of the magnetic core are omitted from illustration. First and second magnetic layers (i.e. upper and lower magnetic layers) 1 and 2 are made of a non-crystalline Co-Ta-Zr alloy deposited, for example, by a sputtering method to a thickness of about 1 μm. A first metal film or underlying film 7 for the upper magnetic layer 1 and a second or overlying metal film 8 for the lower magnetic layer 2 are each formed of Cr, for example, by a sputtering method to a thickness varied within a range of 20 Å to 1000 Å. A gap layer 3 is formed of $SiO_2$, an electrically insulating layer 4 is of polyimide resin, e.g. PIQ mentioned hereinbefore, a base layer 5 supporting the magnetic layer 2 is formed of, for example, $Al_2O_3$. As will be seen, the first metal film 7 is formed at least on the insulating layer 4 for preventing the latter from contacting with the first magnetic layer 1. On the other hand, the second metal film 8 is formed on the second magnetic layer 2 and interposed between the non-magnetic layer 3 and the second magnetic layer 2.

In this embodiment the metal film 7 extends such that it is interposed between the first magnetic layer 1 and the gap layer 3 at the head gap portion and joins with the metal layer 8 at the back contact portion of the head. The interposition of the metal film 7 between the layers 1 and 3 at the head gap portion is advantageous in that the interposed metal film 7 increases adhesion of the layers 1 and 3 to each other. The joining of the metal layers 7 and 8 with each other at the back contact portion of the head is for making contact between the upper and lower magnetic layers 1 and 2 via the joined portions of the metal layers 7 and 8, thereby forming a magnetic path of the head core.

Figure 2:
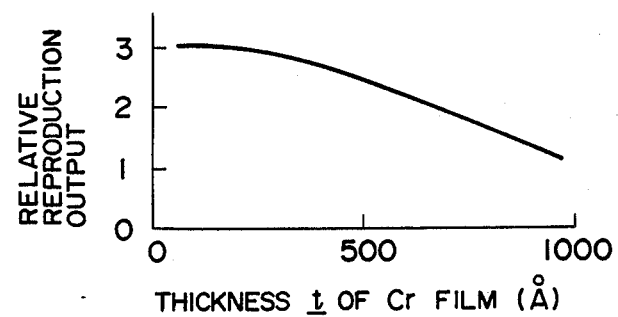
FIGS. 2 and 3 are views for illustrating advantageous effects achieved with the illustrative embodiment of the present invention.
Figure 3:
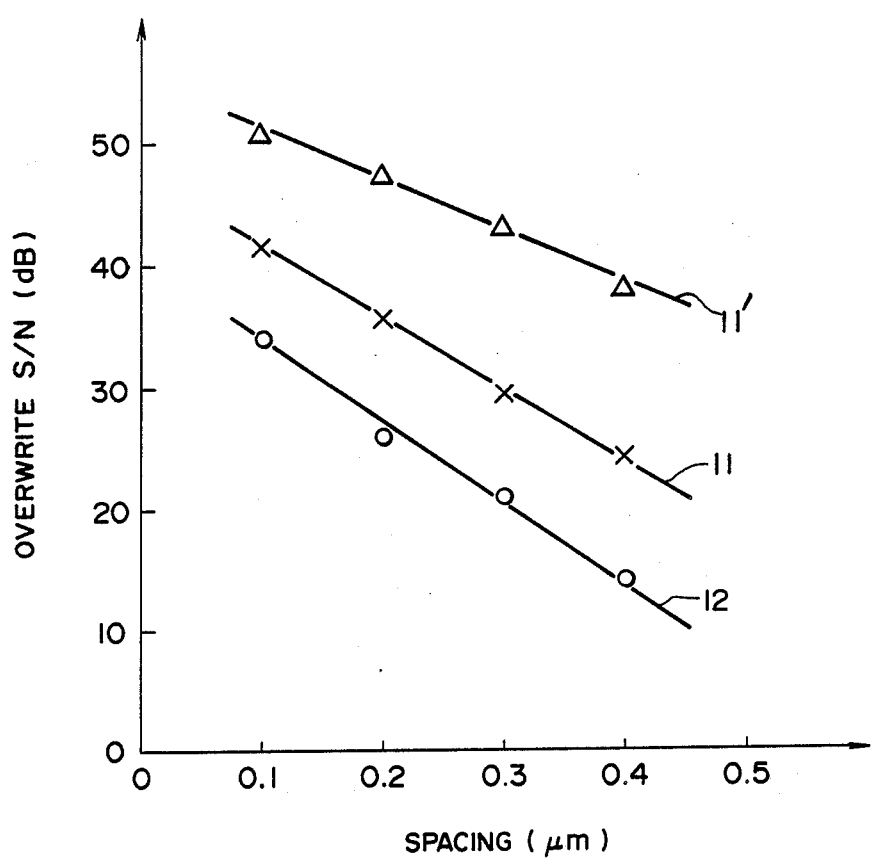

FIGS. 2 and 3 are views for graphically illustrating the effects achieved with the magnetic head structure according to the illustrated embodiment of the present invention on the basis of evaluation of the results obtained from experimental recording/reproduction performed with a disc deposited with $Co-\gamma Fe_2O_3$ by sputtering to a thickness of 0.16 $\mu$m and having a coercive force of 600 Oe. More specifically, FIG. 2 illustrates graphically a relation between the thickness t (see FIG. 1) of the first and second metal films (Cr-films) at their back contact ends and the reproduction output of the thin film magnetic head positioned at a floating distance or spacing of 0.2 $\mu$m and obtained by using a low-density signal of 2 KFCI (kilo-flux changes per inch).

In the case of the illustrated embodiment, since the back contacts of the upper and lower magnetic layers 1 and 2 are realized by means of the metal films 7 and 8, the sum of the thickness of the Cr-films provided on the upper and lower magnetic layers, respectively, represents the gap length in the back contact portion. It should however be understood that the metal films 7 and 8 may be removed at the back contact region to allow the magnetic films 1 and 2 to be contacted directly.

As will be seen in FIG. 2, so long as the back contact end thickness t of the Cr-layer is not greater than about 100 Å, no degradation occurs in the reproduction output, since the reluctance of the Cr-film can be neglected when the gap length at the back contact portion is smaller than about 3% of the gap length between the magnetic poles disposed in opposition to a recording medium. Further, when the back contact end thickness t is 500 Å at most, the reproduction output of 80% of that obtained without the Cr films is available. On the other hand, when the thickness of the Cr-layer 7 interposed between the non-crystalline Co-Ta-Zr alloy layer 1 and the PIQ layer 4 is greater than about 20 Å, reaction which would otherwise take place between the Co-Ta-Zr alloy layer and the PIQ layer 4 in the course of high-temperature process can be suppressed effectively. The same is true with the Cr-film 8, because the magnetic layer 2 will be in contact with the PIQ layer 4 in its deposition step if the film 8 is not provided. When the metal film 8 overlying the lower magnetic layer at the back contact end portion is to be removed, this can be accomplished by sputter etching or the like method in precedence to deposition of the metal film 7.

As will be appreciated from the above description, the thickness of the metal film 7 underlying the upper magnetic layer and the thickness of the metal film 8 overlying the lower magnetic layer 2 should be not smaller than about 20 Å. Thus, the thickness of the back contact ends of the first and second metal fims should be not larger than about 500 Å.

Additionally, a metal film may be provided between the lower magnetic layer 2 and the base layer 5 or on the upper magnetic layer 1 for the purpose of improving the adhesiveness to the protection layer formed thereon. The metal films 7 and 8 may be formed of a metal having a high melting point such as Nb, Ti, Ta, V, Rh, Pt, Pd, W, Mo and other in addition to Cr or an alloy containing the element mentioned above as a main component. However, in view of the fact that no reaction takes place between Cr and the PIQ or the Co-Ta-Zr alloy during high temperature process even at a temperature, for example, of about 400° C. which is the curing temperature of PIQ, which reaction, if occurred, would lead to deterioration in the magnetic characteristics of the thin film magnetic head, Cr is preferred to be used in forming the metal films under consideration. When other metal was used in place of Cr, it has been found that the temperature which the other metal experience during the heat treatment must be lowered by some degree. An Ni-Fe alloy which is used at present for the magnetic pole material of the thin film magnetic head can be used in forming the metal layers 7 and 8. In that case, the upper and lower magnetic layers at the back contact portion can be contacted magnetically perfectly by the Ni-Fe alloy, to a great advantage from the standpoint of the magnetic characteristics of the magnetic head. However, in that case, the temperature which the Ni-Fe alloy undergoes during the heat treatment should be lowered by some degree. The thickness of each metal film made of the above-mentioned metals or alloys may be not smaller than about 20 Å.

FIG. 3 is a view for illustrating a relationship between the overwrite S/N ratio (signal-to-noise ratio) and the floating distance (spacing) of the thin film magnetic head according to the illustrated embodiment of the invention in comparison with that of a hitherto known magnetic head having a magnetic core made of permalloy. With the phrase "overwrite S/N ratio", it is intended to mean the signal to noise ratio obtained by recording a high density signal of 25 KFCI in succession to the recording of a low density signal of 5 KFCI on the assumption that the output level of the signal of 25 KFCI represents the signal with the attenuated output level of 5 KFCI representing the noise. A curve 12 represents characteristic of the prior art thin film magnetic head in which Ni-Fe alloy is used for the magnetic pole material. A curve 11 represents characteristic of a thin film magnetic head manufactured according to the illustrated embodiment of the present invention wherein a non-crystalline, Co-Te-Zr alloy is used to form the head core and a Cr film 500 Å thick is used to form both of the upper and lower magnetic films. As will be seen in FIG. 3, the writing capability of the head is increased in proportion to the saturation flux density of the magnetic material of the magnetic poles, and when the non-crystalline Co-Ta-Zr alloy is used for the magnetic poles an overwrite S/N ratio of 26 dB is available even with a floating distance (spacing) of 0.35 $\mu$m, the 26 dB overwrite S/N ratio being a prerequisite for the disk file system.

For the non-crystalline Co-containing alloy, there may be used in addition to the Co-Ta-Zr alloy, a Co-Nb-Zr alloy and Co-W-Zr alloy, a Co-Nb-Zr alloy and Co-W-Zr alloy. Each of these alloys has the saturation flux density higher than 1.0 T (e.g. 1.3 to 1.5 T) in the composition assuring magnetostriction of approximately zero. In other words, the above mentioned alloys have respective saturation magnetic flux density higher than that of the Ni-Fe alloy used heretofore for the magnetic pole material (which is usually 1.0 T), and thus can assure an improved recording/reproduction efficiency.

The foregoing description of the effects achieved with the embodiment of the invention has been made on the assumption that each of the upper magnetic pole (upper magnetic layer) and the lower magnetic pole (lower magnetic layer) is realized in a multi-layer structure composed of the non-crystalline Co containing alloy layer and the metal layer in the thin film magnetic head manufactured for the experimental purpose.

On the other hand, in the thin film magnetic head whose upper and lower magnetic pole are each realized in the single non-crystalline Co-Ta-Zr alloy layer without the associated metal film, reaction took place between PIQ and the non-crystalline Co-Ta-Zr film (the upper magnetic layer) in the course of high-temperature process at 400° C. effected to improve the permeability, resulting in deposition of reaction product on the non-crystalline Co-Ta-Zr layer, as a consequence of which the permeability could not be improved, remaining at about 500, with the result that the recording/reproduction output was less than ½ when compared with that of the thin film magnetic head according to the illustrated embodiment of the invention. Besides, the $SiO_2$ film formed on the Co-Ta-Zr layer (lower magnetic layer) was delaminated, giving rise to another problem, being accompanied with extremely low manufacturing yield. When the process temperature is selected low so that the reaction with PIQ may not occur, no improvement can be made on the permeability, resulting in correspondingly low recording/reproduction output.

It should be mentioned that by providing either one of the first or second metal film only, the aforementioned problem associated with the manufacturing process can be solved. Formation of the metal film may be carried out by an evaporation method instead of sputtering.

As will be appreciated from the foregoing description, in the case of the thin film magnetic head according to the illustrated embodiment of the present invention, the problems encountered heretofore in the manufacturing process due to the use of the non-crystalline Co containing alloy having high saturation flux density as well as high permeability for the magnetic pole material can be avoided successfully, whereby the thin film magnetic head excellent in the recording performance can be manufactured with enhanced yield.

Next, another embodiment of the present invention will be described by referring to FIG. 1.

First and second magnetic layers 1 and 2 are formed of a crystalline Fe-Si-Ru alloy by a sputtering or vapor deposition method. When the sputtering is employed, the temperature of the base layer 5 is kept about 350° C. in order to improve the soft magnetic characteristic of the alloy layers. The other components 3 to 8 are essentially the same as those of the preceding embodiment with respect to the material, configuration and arrangement.

Again referring to FIGS. 2 and 3, the effects achieved with the magnetic head structure according to the the instant embodiment of the present invention will be explained on the basis of evaluation of the results obtained from experimental recording/reproduction performed with a disc deposited with Co-$\gamma Fe_2O_3$ by sputtering to a thickness of 0.16 μm and having a coercive force of 600 Oe. As described hereinbefore, FIG. 2 illustrates graphically a relation between the thickness t of the first and second metal films (Cr-films) at their back contact ends and the reproduction output of the thin film magnetic head positioned at a floating distance or spacing of 0.2 μm and obtained by using a low-density signal of 2 KFCI (kilo-flux change per inch). Also in the case of the instant embodiment, the back contact of the upper and lower magnetic layers 1 and 2 is realized by way of the metal films 7 and 8. Accordingly, the sum of the thickness of the Cr-films provided on the upper and lower magnetic layers, respectively, represents the gap length in the back contact portion. It should however be understood that the metal films 7 and 8 may be removed at the back contact portion to allow the magnetic films 1 and 2 to be contacted directly.

As will be seen in FIG. 2, so long as the back contact end thickness t of the Cr-layer is not greater than about 100 Å, no degradation occurs in the reproduction output, while 80% of the reproduction output attained in the absence of the Cr-films can be obtained with the thickness of about 500 Å of the Cr-films. On the other hand, when the thickness of the Cr-layer 7 interposed between the Fe-Si-Ru alloy layer 1 and the PIQ layer 4 is greater than about 20 Å, reaction which would otherwise take place between the Fe-Si-Ru alloy layer and the PIQ layer in the course of high-temperature process can be suppressed effectively. The same is true with the Cr-film 8, because the magnetic layer 2 will be in contact with the PIQ layer 4 in its deposition step if the film 8 is not provided. The metal film 8 overlying the lower magnetic layer at the back contact portion can be removed by sputter etching or the like method in precedence to deposition of the metal film 7. As will be appreciated from the above description, the thickness of the metal film 7 underlying the upper magnetic layer should preferably be not smaller than about 20 Å. Thus, the thickness of the back contact ends of the first and second metal films should be not larger than about 500 Å.

Additionally, a metal film may be provided between the lower magnetic layer 2 and the base layer 5 or on the upper magnetic layer 1 for the purpose of improving the adhesiveness to the protection layer formed thereon. The metal films 7 and 8 may be formed of a metal having a high melting point such as Nb, Ti, Ta, V, Rh, Pt, Pd, W, Mo and other in addition to Cr or an alloy containing the element mentioned above as a main component. However, in view of the fact that no reaction takes place between Cr and the PIQ or the Fe-Si-Ru alloy during the high temperature process even at a temperature of about 400° C., which reaction, if occurred, would lead to deterioration in the magnetic characteristics of the thin film magnetic head, Cr is preferred to be used in forming the metal films under consideration. When other metal was used in place of Cr, it has been found that the process temperature must be lowered by some degree. An Ni-Fe alloy which is used at present for the magnetic pole material of the thin film magnetic head can be used in forming the metal layers 7 and 8. In that case, the upper and lower magnetic layers at the back contact portion can be contacted magnetically perfectly by the Ni-Fe alloy, to a great advantage from the standpoint of the magnetic characteristic of the thin film magnetic head. However, in that case, the temperature which the Ni-Fe alloy undergoes during the heat treatment should be lowered by some degree. The thickness of each metal film made of the above-mentioned metals or alloys may be not smaller than 20 Å.

In FIG. 3, a curve 11' represents the relationship between the overwrite S/N ratio and the floating distance (spacing) of the thin film magnetic head manufactured according to the embodiment of the present invention. As will be seen in FIG. 3, in the case of the thin film magnetic head manufactured according to the instant embodiment of the invention, the writing capability is further enhanced and an overwrite S/N ratio of about 40 dB is available even with the floating distance (spacing) of 0.4 μm, which is to be explained by the fact that the crystalline, Fe containing alloy exhibiting a high magnetic saturation flux density is used for the magnetic pole material.

For the Fe containing alloy, there may be used in addition to the Fe-Si-Ru alloy, Fe-Si, Fe-Ru, Fe-Ni, or Fe-C alloy. Each of these alloys may be used in a structure in which a plurality of magnetic layers made of such alloy are laminated with other alloy layers, metal layers or non-magnetic material layers (e.g., Ni-Fe, Ni, Cr, $SiO_2$, $Al_2O_3$ or the like) alternately interposed therebetween. Each of the alloys and the laminate structured alloys has the saturation flux density higher than 1.0 T in the composition assuring magnetostriction of approximately zero. In other words, the above mentioned alloys have respective saturation magnetic flux densities higher than that of the Ni-Fe alloy used heretofore for the magnetic pole material (which is usually 1.0 T) and thus can assure an improved recording/reproduction efficiency.

The foregoing description of the effects achieved with the instant embodiment of the invention has been made on the assumption that each of the upper magnetic pole and the lower magnetic pole is realized in a multilayer structure composed of the Fe containing alloy layer and the metal layer in the thin film magnetic head.

On the other hand, in the thin film magnetic head whose upper and lower magnetic pole are each realized in the single Fe-Si-Ru alloy layer without the associated metal film, reaction took place between PIQ and the Fe-Si-Ru alloy layer (the upper magnetic layer) in the course of high-temperature process for baking PIQ, resulting in deposition of reaction product on the Fe-Si-Ru layer, as a consequence of which the magnetic characteristics of the Fe-Si-Ru alloy layer are degraded with the result that the recording/reproduction output was less than ⅓ when compared with that of the thin film magnetic head according to the instant embodiment of the invention. Besides, the $SiO_2$ film formed on the Fe-Si-Ru layer (lower magnetic layer) was delaminated to another problem, involving extremely low manufacturing yield. It should be added that only by providing one of the first and second metal films, the aforementioned problem associated with the manufacturing process can be solved. Formation of the metal film may be carried out by an evaporation method instead of sputtering.

As will be appreciated from the foregoing description, in the case of the thin film magnetic head according to the illustrated embodiment of the present invention, the problems encountered heretofore in the manufacturing process due to the use of the Fe containing alloy having high saturation flux density as well as high permeability for the magnetic pole material can be avoided successfully, whereby the thin film magnetic head excellent in the recording performance can be manufactured with enhanced yield.

We claim:

1. A thin film magnetic head having a head gap end and a back end comprising:
   first and second magnetic layers magnetically coupled at said back end of the magnetic head to form a magnetic core, each of said magnetic layers being of a material having a saturation magnetic flux density greater than that of a Ni-Fe alloy, said second magnetic layer being supported by a base layer;
   a non-magnetic material layer interposed between said first and second magnetic layers for forming a gap of the magnetic head at said head gap end;
   an electrically insulating layer made of an organic material provided between said first magnetic layer and said non-magnetic layer so that turns of coil wound about said magnetic core are partly formed in electrically insulated relation within said electrically insulating layer; and
   a metal film formed on a portion of said non-magnetic material layer and extending on said electrically insulating layer so that said electrically insulating layer does not contact with said first magnetic layer thereby suppressing reaction between said electrically insulating layer and said first magnetic layer.

2. A thin film magnetic head according to claim 1, in which said metal film is made of a material selected from the group consisting of a high melting point metal, an alloy containing said high melting point metal as a main component and a soft magnetic alloy and each of said first and second magnetic layers is made of a material selected from the group consisting of a cobalt containing, non-crystalline alloy and an iron containing, crystalline alloy.

3. A thin film magnetic head having a head gap end and a back end comprising:
   first and second magnetic layers magnetically coupled at said back end of the magnetic head to form a magnetic core, each of said magnetic layers being of a material having saturation magnetic flux density greater than that of a Ni-Fe alloy, said second magnetic layer being supported by a base layer;
   a non-magnetic material layer interposed between said first and second magnetic layers for forming a gap of the magnetic head at said head gap end;
   an electrically insulating layer provided between said first magnetic layer and said non-magnetic layer so that turns of coil wound about said magnetic core are partly formed in electrically insulated relation within said electrically insulating layer; and
   a metal film formed on said second magnetic layer, said non-magnetic layer being formed on said metal film so that said metal film is sandwiched by said non-magnetic layer and said second magnetic layer, said metal film preventing delamination of said non-magnetic layer from said second magnetic layer.

4. A thin film magnetic head according to claim 3, in which said metal film is made of a material selected from the group consisting of a high melting point metal, an alloy containing said high melting point metal as a main component and a soft magnetic alloy and each of said first and second magnetic layers is made of a material selected from the group consisting of a cobalt containing, non-crystalline alloy and an iron containing, crystalline alloy.

5. A thin film magnetic head having a head gap end and a back end comprising:
   first and second magnetic layers magnetically coupled at said back end of the magnetic head to form a magnetic core, each of said magnetic layers being of a material having a saturation magnetic flux density greater than that of a Ni-Fe alloy, said second magnetic layer being supported by a base layer;
   a non-magnetic material layer interposed between said first and second magnetic layers for forming a gap of the magnetic head at said head gap end;
   an electrically insulating layer made of an organic material provided between said first magnetic layer and said non-magnetic layer so that turns of coil wound about said magnetic core are partly formed in electrically insulated relation within said electrically insulating layer;
   a first metal film formed on a portion of said non-magnetic material layer and extending on said electrically insulating layer so that said electrically insulating layer does not contact with said first magnetic layer thereby suppressing reaction between said electrically insulating layer and said first magnetic layer; and
   a second metal film formed on said second magnetic layer, said non-magnetic layer being formed on said second metal film so that said second metal film is sandwiched by said non-magnetic layer and said second magnetic layer, said second metal film thereby preventing delamination of said non-magnetic layer from said second magnetic layer.

6. A thin film magnetic head according to claim 5, in which each of said first and second metal films is made of a material selected from the group consisting of a high melting point metal, an alloy containing said high melting point metal as a main component and a soft magnetic alloy.

7. A thin film magnetic head according to claim 6, in which said high melting point metal is one of Cr, Nb, Ti, Ta, V, Rh, Pt, Pd, W Mo, and said soft magnetic alloy is an Ni-Fe alloy.

8. A thin film magnetic head according to claim 6, in which the thickness of each of said first and second metal films is not smaller than about 20 Å.

9. A thin film magnetic head according to claim 6, in which each of said first and second magnetic layers contains, as its main component, a material selected from the group consisting of a cobalt containing, non-crystalline alloy and an ion containing, crystalline alloy.

10. A thin film magnetic head according to claim 9, in which said cobalt containing, non-crystalline alloy is an alloy containing as its main component Co-Ta-Zr, Co-Nb-Zr or Co-W-Zr, and said iron containing, crystalline alloy is an alloy containing as its main component Fe-Si, Fe-Ru, Fe-Ni, Fe-C or Fe-Si-Ru.

11. A thin film magnetic head according to claim 5, in which each of said first and second metal films is made of Cr.

12. A thin film magnetic head comprising:
   first and second magnetic layers for constituting a magnetic core, each of said magnetic layers being of a material having a saturation magnetic flux density greater than that of a Ni-Fe alloy, said second magnetic layer being supported by a base layer;
   a non-magnetic material layer interposed between said first and second magnetic layers for forming a gap of the magnetic head;
   an electrically insulating layer made of an organic material provided between said first magnetic layer and said non-magnetic layer so that turns of coil wound about said magnetic core are partly formed in electrically insulated relation within said electrically insulating layer;
   a first metal film provided so as to extend on said non-magnetic material layer and said electrically insulating layer so that said electrically insulating layer does not contact with said first magnetic layer thereby suppressing reaction between said electrically insulating layer and said first magnetic layer; and
   a second metal film formed on said second magnetic layer, said non-magnetic layer being formed on said second metal film so that said second metal film is sandwiched by said non-magnetic layer and said second magnetic layer, said second metal film thereby preventing delamination of said non-magnetic layer from said second magnetic layer said first and second metal films joining with each other at their ends which do not contribute to formation of the gap of the head.

13. A thin film magnetic head according to claim 12, in which the thickness of the joining ends of said first and second metal films is not larger than about 500 Å.

14. A thin film magnetic head according to claim 10, wherein said non-magnetic material layer is made of a material selected from the group consisting of $SiO_2$ and $Al_2O_3$, and wherein said electrically insulating layer is made of polyimide resin.

15. A thin film magnetic head according to claim 14, wherein each of said first and second metal films is made of Cr.

16. A thin film magnetic head according to claim 5, wherein each of said first and second magnetic layers have a saturation magnetic flux density greater than 1.0 T.

17. A thin film magnetic head according to claim 5, wherein each of said first and second magnetic layers has a saturation magnetic flux density of 1.3 to 1.5 T.

* * * * *